United States Patent [19]

Bergomi

[11] 4,042,742
[45] Aug. 16, 1977

[54] REINFORCING ELEMENT FOR FLEXIBLE STRUCTURES, IN PARTICULAR PNEUMATIC TIRES

[75] Inventor: Luciano Bergomi, Milan, Italy

[73] Assignee: Industrie Pirelli S.p.A., Milan, Italy

[21] Appl. No.: 129,613

[22] Filed: Mar. 30, 1971

[30] Foreign Application Priority Data

Mar. 31, 1970  Italy .................................. 22692/70

[51] Int. Cl.² ............................................. D04H 1/74
[52] U.S. Cl. .................. 428/295; 152/361 R; 152/361 FP; 152/361 DM; 152/354; 152/356; 156/128 R; 156/245; 264/108; 264/326; 425/28 R; 428/375; 428/401; 428/440; 428/441; 428/442; 428/402
[58] Field of Search ..... 152/361 R, 361 FP, 361 DM, 152/354, 356; 161/144, 165, 170, 202; 156/177, 178, 128 R, 245; 428/902, 440, 910, 441, 492, 442, 401, 375, 295; 425/28 R; 264/108, 326

[56] References Cited

U.S. PATENT DOCUMENTS

| | | | |
|---|---|---|---|
| 3,095,026 | 6/1963 | Weber | 152/361 |
| 3,095,027 | 6/1963 | Weber | 152/361 |
| 3,131,744 | 5/1964 | Boussu et al. | 152/361 |
| 3,599,696 | 8/1971 | Hartz | 152/361 |

FOREIGN PATENT DOCUMENTS

| | | |
|---|---|---|
| 1,008,397 | 10/1965 | United Kingdom |
| 870,479 | 6/1961 | United Kingdom |

*Primary Examiner*—George F. Lesmes
*Assistant Examiner*—Stanley S. Silverman
*Attorney, Agent, or Firm*—Stevens, Davis, Miller & Mosher

[57] ABSTRACT

A reinforcing element, intended in particular for pneumatic tires, and a method for obtaining it, said element consisting of a rubber compound matrix wherein are dispersed individual glass fibers oriented along a preferred direction and having a diameter to length ratio comprised between 1/10 and 1/100.

The reinforcing element shows a resistance to compression, in the direction of orientation of the fibers, which is substantially higher both than the resistance measured along any other significantly divergent direction and than the resistance of a like reinforcing element consisting solely of the said rubber compound matrix.

11 Claims, No Drawings

REINFORCING ELEMENT FOR FLEXIBLE STRUCTURES, IN PARTICULAR PNEUMATIC TIRES

The present invention concerns reinforcing elements for rubber-base flexible structures, which can be used in several articles produced in rubber industry and in particular in pneumatic tires, and it relates especially to reinforcing elements of the type comprising a filamentary material divided into segments (herebelow called "fibers") which, being embedded in a rubber sheet, constitutes a reinforcement for it, so that said sheet can be on its turn incorporated in a more complex structure, as for instance a pneumatic tire or a belt, with the result of improving some mechanical characteristics of the article.

Various types of such reinforcements, as for instance sheets of rubber, or better of a compound containing rubber and other ingredients and incorporating fibers of different materials (nylon fibers, metallic filaments, glass fibers and the like) not having a particular orientation, so as to obtain a material having a greater compactness than rubber, and therefore a higher resistance to tension or to abrasion, have already been proposed in rubber industry.

Reinforcements of such kind have been used for the manufacture of pneumatic tires, in a position below the tread in order to provide a certain resistance to the penetration of small sharp bodies which might deteriorate the carcass, or directly incorporated in the tread itself in order to reduce the wear of the latter, as described for instance in British Pat. Nos. 870,479, 1,008,397 and 1,157,563.

Reinforcing elements constituted by sheets of compound containing fibers of different materials oriented in a given direction have also been proposed, the obtained material having high characteristics of resistance to tension in the direction of the fibers.

Reinforcements of this kind have been used in the manufacture of pneumatic tires, in addition to or in substitution of rubberized cord fabrics, in order to try to achieve an advantageous compromise between the high mechanical resistance needed in pneumatic tires and their flexibility, as described for instance in the French Pat. No. 1,305,692 and in the U.S. Pat. No. 3,095,027.

The orientation of the fibers incorporated in the compound can be obtained, as known, by means of a passage of the compound itself into appropriate machines, as calenders, mixers, extruders and the like.

The incorporation in the compound of the above indicated oriented fibers originates a material which, although it has a good flexibility, offers a poor resistance to a compression exerted in the direction of the length of the fibers.

As it has been confirmed by studies of the Applicant, an improved resistance to compression in a given direction, orthogonal to the minimum dimension (thickness) of the element, would be instead desirable. In fact, and in particular in the zone below the tread, reinforcing structures are used which, besides conferring to the tire a high degree of radial flexibility, can improve the tire road holding if they are also able to ensure a good resistance to compression in the transversal direction.

Moreover, the oriented fibers of already known type constitute true foreign bodies embedded in the compound, due to their own peculiar mechanical characteristics quite different from those of the compound itself, which involve further problems as regards stress concentration, bonding of the fibers to the compound and uniform distribution of the fibers into it.

One of the aims of the present invention is that of providing a reinforcing material, based on a rubber compound, which, besides possessing high flexibility characteristics, offers a good resistance to compression stresses in a pre-established direction.

A further aim of the invention is that of providing a process intended to obtain said reinforcing material.

Accordingly, one of the objects of the invention is a reinforcing element for flexible structures made of a rubber compound, in particular for pneumatic tires, having relevant anisotropic characteristics and characterized in that individual fibers of a mineral material having a tensional modulus of elasticity of at least 5,000 Kg/mm$^2$ are dispersed in a substantially uniform manner in a rubber compound in an amount ranging from 2% to 30% and preferably from 3% to 20% by weight on the total weight of the compound, said fibers being prevailingly oriented in said element along a pre-established direction substantially orthogonal to the direction defined by said minimum dimension and having a minimum length of 0.1 mm, the diameter to length ratio of the fibers ranging between 1/10 and 1/100, and said reinforcing element having, in the direction of the prevailing orientation of the fibers, a resistance to compression higher than that of the compound alone.

According to a particular embodiment of the invention, the diameter of the fibers ranges between 0.002 and 0.02 mm and their length ranges between 0.1 and 1 mm and preferably between 0.15 and 0.50 mm.

In the range of the indicated dimensions, the diameter to length ratio equal to 1/100 can be considered the limit within which the fibers are better able to withstand compression stresses without suffering any flexion.

On the other hand, the diameter to length ratio equal to 1/10 can be considered the minimum value below which it is difficult to obtain a good orientation of the fibers embedded in the compound.

According to an advantageous embodiment of the invention, the fibers embedded in the compound can be glass fibers, carbon fibers or equivalent mineral fibers, whose surface has been treated in a manner already known in this technique to ensure their intimate and permanent adhesion with the rubber compound in which they are embedded.

The improved resistance to compression, in the direction of orientation of the fibres, is evaluated by the increase of the compressive modulus of elasticity. Being it known that materials of this kind have elasticity moduli continuously variable according to their elongation, in the present specification and in the claims reference is always made to the compressive modulus of elasticity measured in conditions equivalent to those of real employment of the reinforcing element forming the object of the invention.

The measurement of said elasticity modulus is carried out according to the following modalities, intended to reproduce in the best way the real operative conditions of the tire.

The specimen is constituted by a small slab of the product, 200 × 200 × 4 mm size, which is cured in an appropriate mould. During the curing step, a sheet of tombac, 200 × 200 × 0.1 mm size, is applied on one face of the specimen in such a way that, after curing, a slab is available, carrying the tombac sheet bonded on one of its surfaces. The specimen, after having been leant on two parallel blades, 200 mm long and spaced at a distance of 190 mm, is subjected to a flexion stress; said tombac sheet, carried by the specimen face leaning on the blades, contains the neutral axis of the whole structure, by virtue of the fact that its modulus of elasticity is extremely higher than that of the slab of product under test. By means of a third blade, parallel to the others and fast with a sensitive element of a scale, a camber of 10 mm is imparted to the midline of the specimen, and then the value of the corresponding reaction is determined. In this way the slab is subjected to a compression stress and it is possible, by means of simple formulae, already known in construction theory, to evaluate the total apparent elasticity modulus of the product under test in the two orthogonal directions parallel to the longer edges of the specimen. If in the specimen the preferred direction of orientation of the fibers is made coincident with the direction of one of its sides (as in the case of tests on reinforcing elements according to the invention), it is possible to evaluate the compressive modulus of elasticity in said preferred direction and in the perpendicular direction.

Preferably, the resistance to compression of the reinforcing element, in the direction of prevailing orientation of the fibers, is increased in such a way that the compressive modulus of elasticity in said direction is at least three times and preferably four times the compressive modulus of elasticity of the compound alone.

The anisotropy of the reinforcing element, determined by the prevailing orientation of the fibers, results in a compressive modulus of elasticity which is significantly higher than in any other significantly divergent direction and, in particular, is much higher in the preferred direction than in the direction perpendicular to it, the ratio between these moduli being equal to at least 1.4.

The ratio between the compressive modulus of elasticity in the preferred direction and that in the perpendicular direction (or anisotropy degree) can however reach much higher values, as for instance of 4 or over, by increasing the percentage of the mineral reinforcing fibers. It has in fact been noticed that the compressive modulus of elasticity in the preferred direction increases rapidly by increasing the percentage of mineral fibers, whilst said modulus in the perpendicular direction does no longer increase after the addition of a certain percentage of fibers and, anyhow, increases less rapidly even with small percentages.

The mineral reinforcing fibers can be of various types; they are preferably glass fibers or carbon fibers. The first are further preferred, and are advantageously employed with diameters ranging between 2 and 20 microns.

A further object of the invention is a process for obtaining a reinforcing element for flexible structures, characterized by the following steps:

a. preparation of the rubber compound by means of known methods of addition and mixing;

b. addition to the compound of mineral fibers in an amount ranging between 2% and 30%, and preferably between 3% and 20% by weight on the total weight of the compound, said fibers having a tensional modulus of elasticity of at least 5,000 Kg/mm$^2$ and a length not smaller than 100 times their diameter;

c. mechanical treatment of the compound containing said fibers, intended to obtain that:

$c_1$. said fibers be individually dispersed in the compound in a substantially uniform manner, and that $c_2$. the length of the most part of them is reduced in such a measure that the diameter to length ratio of the fibers ranges between 1/10 and 1/100;

d. further mechanical treatment of the heterogeneous mixing constituted by said compound and by said fibers, so as to convert the mixing into an elongated shaped product in which the most part of the fibers is oriented in a direction substantially parallel to the greater dimension of the product.

In the Applicant's opinion, "chopping forces" are generated by the rubber compound in plastic condition which, overcoming the resistance of the glass fibers, are able to reduce their length and to facilitate in a further way their dispersion in the whole mass.

This phenomenon affords another advantage of the described process, i.e. the fact that the length of the glass fibers can be determined during the same mixing operation.

In fact, it as been experimentally ascertained that the length of said fibers can be reduced down to certain values which depend on the plasticity of the rubber compound and on the diameter to length ratio of the fibers themselves; after having reached certain length values, the fibers cannot be shortened any longer, presumably because the "chopping forces" are withstood by the progressively decreasing brittleness of the fibers, due to their reduced length.

The transformation of the compound into shaped products is carried out in a conventional manner by means of extruders or calenders.

By operating in this way, it can be noted that a high degree of uniformity and dispersion of the glass fibers in the rubber compound is obtained.

Preferably, the glass fibers are introduced in the rubber compound in lengths not smaller than 1 mm and even considerably greater, as available in the trade. In spite of this, by means of the above treatment, it is possible to obtain fibers of the desired length and of substantially uniform dimensions, which is of great importance in view of the mechanical behaviour of the reinforcing element. Preferably, the diameter to length ratio of the fibers is comprised, for at least 50% by weight of said fibers, between 1/25 and 1/50.

In general, the average length of the obtained fibers ranges between 0.15 and 0.50 mm and the dispersion of the lengths is low and is defined by a $\sigma$ (standard deviation) ranging between 0.15 and 0.06. Both the average and the scatterings in respect of the $\sigma$ calculation are referred to the weight of the fibers. The most part of the fibers has in general a length not greater than 1 mm. It is obvious, and it is to be pointed out, that there may always be a small amount of anomalous fibers, namely of too chopped fibers or of fibers having still a length nearly corresponding to the initial one. Therefore, all the dimensional data indicated in this specification and in the claims are to be interpreted without reference to such anomalous fibers, which are never present in significant amount, such as to have a remarkable influence on the mechanical properties of the product.

It has been ascertained that, when the desired dimension of the fibers has been obtained, it remains sufficiently constant; therefore, even if the compound containing the fibers is mixed for a time longer than needed, this has not particular impairing consequences.

The possibility of obtaining fibers of controlled length, grouped about an average value comprised within a rather narrow range is referred, as it is at present assumed, to the physical characteristics of the reinforcing fibers and, in particular, to their brittleness and dimensions on one hand and to the actions exerted onto them by the compound itself in the mixing phase on the other hand. Substantially, it is deemed that the reduction in the length of the fibers and the achievement of the above length values is not due to a mechanical action of the mixing devices, but to an action of the compound on the fibers themselves.

The invention will now be illustrated by the following examples, which have not a limiting character.

EXAMPLE 1

Reinforcing element, intended in particular to be used in the breaker of pneumatic tires.

A compound, based on natural rubber and having the following recipe, is prepared in a closed mixer, according to the conventional procedure:

| Natural rubber | 100 | parts by weight |
|---|---|---|
| Accelerator | 1 | " |
| Antioxidants | 2 | " |
| Zinc oxide | 5 | " |
| Stearic acid | 2 | " |
| FEF Black | 40 | " |
| Plasticizer | 5 | " |
| Sulphur | 2.5 | " |

After the compounding operation, the compound has a plasticity index of 65 Mooney.

Now glass fibers, having a length not smaller than 1 mm and a diameter of 9 microns are added to the compound in a percentage ranging between 8% and 20% on the total weight of the latter; in the above reported example said percentage is of 15 parts on 100 parts of the compound.

The subsequent mixing operation of the compound with glass fibers is carried out for 1/20 inch at a temperature of 70° C.

After this operation the glass fibers are reduced into particles, whose lengths are significantly grouped about a mean value of 0.5 mm. The obtained product can then be treated in an open mill; in that case the length of the glass fibers is further reduced, till to have an average value of 0.25 mm.

A sheet having a thickness of 3 mm is obtained by calendering from the compound; in the sheet body the most part of the particles of glass fibers are oriented in the direction of motion of the sheet itself, by virtue of a phenomenon already known in rubber industry.

The sheet is cut into strips at a certain angle with respect to the direction of the particles, to be then used in the production phase as a reinforcing element for breakers of pneumatic tires.

EXAMPLE 2

Reinforcing element, intended in particular to be used in pneumatic tire treads.

A compound, based on natural rubber and having the following recipe, is prepared in a closed mixer, according to the conventional procedure.

| Natural rubber | 100 | parts by weight |
|---|---|---|
| Accelerator | 1 | " |
| Antioxidants | 2 | " |
| Zinc oxide | 5 | " |
| Stearic acid | 2 | " |
| ISAF Black | 50 | " |
| Plasticizer | 10 | " |

-continued

| Sulphur | 2.5 | " |
|---|---|---|

After the compounding operation, the compound has a plasticity index of 65 Mooney.

Now glass fibers, having a minimum length of 1 mm and a diameter of 9 microns are added to the compound in a percentage ranging between 2% and 7% on the total weight of the latter; in the above reported example, 3 parts of glass fibers are added on 100 parts of the compound.

The subsequent mixing of the compound with glass fibers is carried out for 1/20 at a temperature of 70° C.

After this operation the glass fibers are reduced into particles, whose lengths are significantly grouped about a means value of 0.45 mm.

A shaped band, to be used as the tread of pneumatic tires, is obtained by extrusion from said compound; in the band body the most part of the particles of glass fibers are oriented in the direction of motion of the band itself, also in this case by virtue of an already known phenomenon.

EXAMPLE 3

Reinforcing element, intended to be used in particular for filling special zones of pneumatic tires.

A compound, based on natural rubber and having the following recipe, is prepared in a closed mixer, according to the conventional procedure:

| Natural rubber | 100 | parts by weight |
|---|---|---|
| Accelerator | 0.4 | " |
| Antioxidants | 3.5 | " |
| Zinc oxide | 5 | " |
| Stearic acid | 3 | " |
| HF Black | 70 | " |
| Plasticizer | 5.5 | " |
| Sulphur | 2.75 | " |

The plasticity of this compound is not substantially different from that indicated in Examples 1 and 2. Glass fibers, having a length not smaller than 1 mm and a diameter of 9 microns, are added to the compound in an amount of 6% on the weight of the compound itself. The subsequent mixing of the compound with glass fibres is carried out for 1/20 at a temperature of 70° C.

After a further treatment in an open mill, a shaped product is obtained by extrusion from this compound; in the body of the product the most part of the glass fibers are oriented in the direction of the extrusion motion.

After the extrusion operation, the glass fibers are reduced into particles, whose lengths are significantly grouped about a mean value of 0.24.

The determination of the standard deviation ($\sigma$) of the length of the fibers has been carried out on the obtained product, the scatterings and therefore both the average and the $\sigma$ of such lengths being referred to the amount of the fibers by weight.

To carry out the evaluation of the length of the glass fibers dispersed in the rubber compound, a specimen is taken from the obtained product. Said specimen is squeezed in a press in the direction orthogonal to the direction of the length of the fibers, until a thickness of 0.1 mm is reached. It is to be remarked that, during said operation, the glass fibers lose partially their orientation, in consequence of the deformation suffered by the specimen, but do not suffer any further rupture, since the compression is exerted in the direction orthogonal to the direction of said fibers. A radiograph of the squeezed specimen is made; said radiograph, appropriately enlarged, gives the possibility of measuring the length of the fibers embedded in the compound.

Also, an evaluation has been made of the compressive modulus of elasticity, both of the compound alone and of the reinforced element, as regards the latter said evaluation being made both in the prevailing direction of orientation of the fibers and in orthogonal direction. The measurement of such modulus is effected according to the above indicated testing modalities.

The results of the measurements are reported in the following table:

|  | Product according to Ex. 1(+) | Product according to Ex. 2 | Product according to Ex. 3 |
|---|---|---|---|
| Compressive modulus of elasticity of the compound without fibers Kg/mm$^2$ | 0.8 | 0.5 | 0.7 |
| Compressive modulus of elasticity of the compound with fibers, measured in the direction of the fiber length Kg/mm$^2$ | 9.35 | 2 | 4.4 |
| Compressive modulus of elasticity of the compound with fibers, measured in the direction orthogonal to the fiber length Kg/mm$^2$ | 2.2 | 1.33 | 2.2 |
| Average length of the fiber mm | 0.25 | 0.45 | 0.24 |
| Standard deviation of the fiber length ($\sigma$) | 0.095 | 0.13 | 0.101 |

(+)The indicated values refer to the product further treated in an open mill.

It is understood that the present invention is not limited to the above reported examples, but that it includes any other alternative embodiment or modification accessible to a technician of this field and deriving from the above indicated inventive concept.

What I claim is:

1. An elongated rubber base element designed for forming part of and reinforcing pneumatic tires, and consisting of a rubber compound matrix and of individual fibers evenly dispersed therein, wherein said fibers consist of a mineral material having a tensional modulus of elasticity of at least 5,000 Kg/mm$^2$ and have a diameter comprised between 0.002 and 0.02 mm, the diameter to length ratio of said individual fibers being comprised between 1/10 and 1/100, their length being in any case not less than 0.1 mm, the amount of said fibers being comprised between 2 and 30 percent by weight of the weight of said matrix, the major part of said fibers being embedded and arranged in said matrix in essentially parallel relationship to one another in a direction essentially perpendicular to the smallest dimension of said element, the resistance of said element to compressional stress in said direction being substantially higher than that of a like element consisting solely of the said rubber compound matrix.

2. A reinforcing element as in claim 1, characterized in that the length of the most part of the fibers embedded in said element is comprised between 0.1 and 1 mm.

3. A reinforcing element as in claim 2, characterized in that the reinforcing fibers embedded in said element have an average length comprised between 0.15 and 0.50 mm and a dispersion of their lengths defined by a standard deviation comprised between 0.15 and 0.06, said average and said standard deviation being referred to the weight of the fibers.

4. A reinforcing element as in claim 1, characterized in that, in the direction of the prevailing orientation of the fibers, it has a compressive modulus of elasticity equal to at least three times the compressive modulus of elasticity of the compound alone.

5. A reinforcing element as in claim 4, characterized in that, in the direction of the prevailing orientation of the fibers, it has a compressive modulus of elasticity equal to at least four times the compressive modulus of elasticity of the compound alone.

6. A reinforcing element as in claim 1, characterized in that, in the direction of the prevailing orientation of the fibers, it has a resistance to compression significantly higher than its resistance to compression in any other significantly divergent direction.

7. A reinforcing element as in claim 1, characterized in that, in the direction of the prevailing orientation of the fibers, it has a compressive modulus of elasticity equal to at least 1.4 times the compressive modulus of elasticity in the perpendicular direction.

8. A reinforcing element as in claim 1, characterized in that the reinforcing material is constituted by glass fibers.

9. A reinforcing element as in claim 1, characterized in that at least 50% of the reinforcing fibers embedded in said element has a diameter to length ratio comprised between 1/25 and 1/50.

10. A reinforcing element for flexible structures as in claim 7, in which the individual fibers are glass fibers, particularly intended to be used as breaker of pneumatic tires, characterized in that the weight percentage of said fibers is comprised between 8% and 20% on the total weight of the compound.

11. A reinforcing element for flexible structures as in claim 7, in which the individual fibers are glass fibers, particularly intended to be used as breaker of pneumatic tires, characterized in that the weight percentage of said fibers is comprised between 2% and 7% on the total weight of the compound.

* * * * *